C. F. LOGEMAN.
TWEEZERS FOR SURGICAL OPERATIONS.
APPLICATION FILED NOV. 14, 1918.
1,294,284.
Patented Feb. 11, 1919.
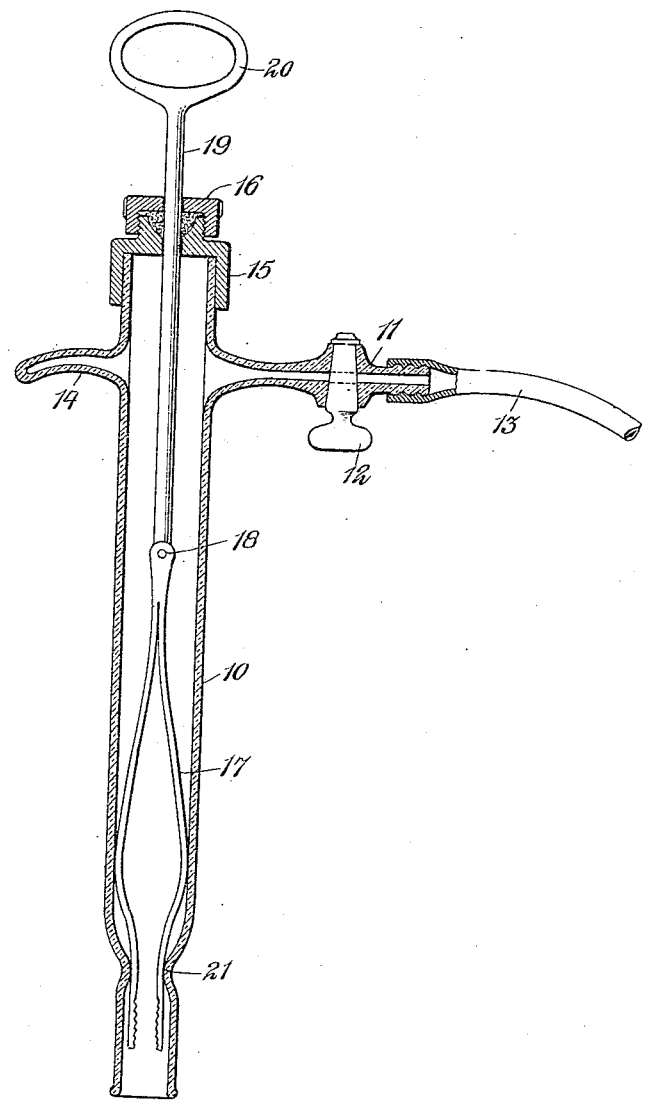
WITNESSES
INVENTOR
C. F. Logeman
BY
ATTORNEYS

UNITED STATES PATENT OFFICE.

CHARLES FREDERICK LOGEMAN, OF SOMERSET WEST, NEAR CAPE TOWN, CAPE PROVINCE, SOUTH AFRICA.

TWEEZERS FOR SURGICAL OPERATIONS.

1,294,284.  Specification of Letters Patent.  Patented Feb. 11, 1919.

Application filed November 14, 1918. Serial No. 262,547.

*To all whom it may concern:*

Be it known that I, CHARLES FREDERICK LOGEMAN, a citizen of the Union of South Africa, and a resident of Somerset West, near Cape Town, Cape Province, South Africa, have invented a new and Improved Tweezers for Surgical Operations, of which the following is a description.

My invention relates to tweezers and while adapted for other uses is more particularly designed for use in surgical operations. If in the cavity of a wound for example, the surgeon seeks a ligament, membrane, or the like that he wishes to take hold of, instead of inserting the tweezers and fishing or exploring the cavity with ordinary tweezers or probe, my invention provides a means adapted to employ the vacuum principle to draw the ligament, membrane, or the like to the tweezers to be gripped by the latter.

Reference is to be had to the accompanying drawing which it is understood is given as one example of my invention, the view showing my improved tweezers in longitudinal section.

In carrying out the invention in practice, in accordance with the illustrated example, a barrel 10 which usually will be of glass, is formed with an open front end and with a lateral branch 11 having a suitable valve 12 to receive a hose 13 for connection with any approved vacuum pump or the like (not shown). The barrel is formed near the rear end with projections 14 and advantageously the branch or nipple is formed on one of the projections and communicates through the latter with the barrel.

The rear end of the barrel 10 is closed by a cap 15 having a packing gland 16 and through said rear cap and gland extends a rod 19 having an eye 20 or the like at the outer end to receive the thumb of the operator. Within the barrel a tweezers 17 is secured to the front end of the rod 19 as at 18. The jaws of the tweezers are slightly bowed rearward of the front ends thereof and the barrel 10 is constricted as at 21 so that a forward movement of the tweezers 17 in response to the action of the rod 19 will cause the jaws of the tweezers to close.

In practice the front end of the tube 10 is inserted into the cavity to be explored for location of the element to be gripped by the front end of the tweezers. The operator holds the barrel between the first and second fingers with the projections 14 engaged by said fingers, while the thumb is inserted in the eye 20, and opens the valve 12 with the remaining fingers of the same hand or with the other hand, so that the vacuum in the tube 13 will be communicated to the barrel, whereby the ligament or the like will be drawn into the barrel 10 toward the tweezers. The tweezers are now given a forward movement so that the constriction 21 causes the tweezers to firmly take hold of the element to be gripped and the device is then bodily withdrawn from the wound or cavity, the vacuum in the meantime being maintained as long as the operator may desire.

I wish to state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. In a tweezers of the class described, a barrel having means to connect the same with a vacuum pump, the front end of said barrel being open and adapted to be entered in a wound or cavity for searching out an element to be gripped, tweezer jaws disposed in said barrel and adapted to lie within the front end thereof, a rod extending into said barrel and carrying said tweezers, said rod being operable from the exterior of the barrel to give longitudinal movement to the tweezers relatively to the barrel, and means within the barrel to cause a closing movement of the tweezer jaws by a forward longitudinal movement of the said tweezers in the barrel.

2. In tweezers of the class described, a barrel having an open front end adapted to be inserted in a wound or cavity, a hollow member on said barrel adjacent to the rear end, a branch on said member and communicating through the latter with said barrel, said branch being adapted for connection with a pump or the like, and a valve in said branch, a rod extending into said barrel through the rear end thereof, and tweezers carried by said rod and having bowed jaws, said barrel being constricted adjacent to the front end to cause a closing of the jaws by a forward movement of said tweezers in response to movement of said rod.

3. In a tweezers of the class described, a barrel having means to connect the same with a vacuum pump, the front end of said barrel being open and adapted to be inserted in a wound or cavity to locate an element to be gripped, tweezer jaws disposed in said barrel, means operable from the exterior of the barrel to give longitudinal movement to the tweezers relatively to the barrel, and means within the barrel and adapted to cause a closing movement of the tweezers upon a forward movement of the latter in the barrel.

CHARLES FREDERICK LOGEMAN.

Copies of this patent may be obtained for five cents each, by addressing the "Commissioner of Patents, Washington, D. C."